United States Patent
Cleve et al.

(10) Patent No.: US 10,133,981 B2
(45) Date of Patent: Nov. 20, 2018

(54) METHOD FOR THE COMPUTER-ASSISTED MODELING OF A WIND POWER INSTALLATION OR A PHOTOVOLTAIC INSTALLATION WITH A FEED FORWARD NEURAL NETWORK

(75) Inventors: Jochen Cleve, København (DE); Ralph Grothmann, München (DE); Kai Heesche, München (DE); Christoph Tietz, Ottobrunn (DE); Hans-Georg Zimmermann, Starnberg/Percha (DE)

(73) Assignee: SIEMENS AKTIENGESELLSCHAFT (DE)

( * ) Notice: Subject to any disclaimer, the term of this patent is extended or adjusted under 35 U.S.C. 154(b) by 1074 days.

(21) Appl. No.: 14/239,313

(22) PCT Filed: Jul. 24, 2012

(86) PCT No.: PCT/EP2012/064529
§ 371 (c)(1),
(2), (4) Date: Mar. 18, 2014

(87) PCT Pub. No.: WO2013/023887
PCT Pub. Date: Feb. 21, 2013

(65) Prior Publication Data
US 2014/0201118 A1    Jul. 17, 2014

(30) Foreign Application Priority Data
Aug. 18, 2011   (DE) .................. 10 2011 081 197

(51) Int. Cl.
*G06N 3/10* (2006.01)
*G06N 3/04* (2006.01)

(52) U.S. Cl.
CPC ................ *G06N 3/10* (2013.01); *G06N 3/04* (2013.01)

(58) Field of Classification Search
CPC ............ G06N 3/049; G06N 3/10; G06N 3/02; G06N 3/063; G06N 3/04
See application file for complete search history.

(56) References Cited

U.S. PATENT DOCUMENTS

| 5,347,613 A | 9/1994 | Chung .......................... 395/24 |
| 8,587,140 B2 | 11/2013 | Egedal et al. .................. 290/44 |

(Continued)

FOREIGN PATENT DOCUMENTS

| CN | 101546389 A | 9/2009 |
| CN | 101667013 A | 3/2010 |

(Continued)

OTHER PUBLICATIONS

European Office Action, dated Feb. 18, 2015, issued in corresponding European Patent Application No. 12742855.5. Total 6 pages.

(Continued)

*Primary Examiner* — Robert A Cassity
*Assistant Examiner* — Robert Bejcek, II
(74) *Attorney, Agent, or Firm* — Ostrolenk Faber LLP

(57) ABSTRACT

Disclosed is a method for the computer-assisted modeling of a technical system. One or more output vectors are modeled dependent on one or more input vectors by the learning process of a neural network on the basis of training data of known input vectors and output vectors. Each output vector comprises one or more operating variables of the technical system, and each input vector comprises one or more input variables that influence the operating variable(s). The neural network is a feedforward network with an input layer, a plurality of hidden layers, and an output layer. The output layer comprises a plurality of output clusters, each of which consists of one or more output neurons, the plurality of output clusters corresponding to the plurality of hidden (Continued)

layers. Each output cluster describes the same output vector and is connected to another hidden layer.

13 Claims, 2 Drawing Sheets

(56) References Cited

U.S. PATENT DOCUMENTS

| | | | | |
|---|---|---|---|---|
| 2003/0217021 | A1* | 11/2003 | Jacobson | F02D 41/1405 706/16 |
| 2010/0088261 | A1* | 4/2010 | Montalvo | H02J 3/14 706/15 |
| 2010/0127495 | A1* | 5/2010 | Egedal | G05B 13/027 290/44 |
| 2010/0205974 | A1* | 8/2010 | Schneegass | F02C 9/00 60/772 |
| 2011/0112428 | A1 | 5/2011 | Hsieh | 600/547 |
| 2012/0078436 | A1* | 3/2012 | Patel | G06N 3/08 700/298 |
| 2012/0303562 | A1* | 11/2012 | Paguio | G11B 5/3163 706/19 |
| 2014/0201118 | A1* | 7/2014 | Cleve | G06N 3/04 706/44 |

FOREIGN PATENT DOCUMENTS

| | | |
|---|---|---|
| CN | 101737257 A | 6/2010 |
| CN | 101769788 A | 7/2010 |
| CN | 102142693 A | 8/2011 |
| EP | 2192456 A1 | 6/2010 |
| JP | H03-185555 | 8/1991 |
| RU | 2303812 C2 | 7/2007 |
| TW | 201116256 A1 | 5/2011 |

OTHER PUBLICATIONS

Chinese Office Action dated Sep. 10, 2015 in corresponding Chinese Patent Application No. 201280040274.2 with Search Report.

N.O. Jensen, "A Note on Wind Generator Interaction". Technical Report m-2411, Risø, Roskilde, 1983.

I. Katic, J. Højstrup and N.O. Jensen, "A Simple Model for Cluster Efficiency". In EWEC 1986, vol. 1, pp. 407-410, Rode, 1986.

Tang, Z.; Fishwick, P.A.: "Feed-forward Neural Nets as Models for Time Series Forecasting", in: ORSA Journal on Computing, 5, 1993,4, pp. 374-385. http://citeseerx.ist.psu.edu/viewdoc/download?doi=10.1.1.48.2583&rep=rep1&type=pdf [downloaded on Nov. 18, 2011].

Matignon, R.: "Neural Network Modeling using SAS Enterprise Miner". Bloomingron: Authorhouse, Aug. 17, 2005, 604 pages. http://www.sasenterpriseminer.com/documents/Chapter3-3.pdf [downloaded on Nov. 18, 2011].

Mashor, My.: "Hybrid multilayered perceptron networks". In: International Journal of Systems Science, 31, 2000, 6, pp. 771-785. http://www.tandfonline.com/doi/pdf/10.1080/00207720050030815 [downloaded on Nov. 18, 2011].

Ghanbarzadeh, A. et al.: "Wind speed prdiciton based on simple meteorological data using artificial neural network". In: 7th IEEE International Conference on Industrial Informatics, 2009.INDIN 2009, Jun. 2009, pp. 664-667. http://ieeexplore.ieee.org/stamp/stamp.jsp?tp=&arnumber=5195882 [downloaded on Nov. 21, 2011].

Yaser Soliman Qudaih et al: "Power Distribution System Planning for Smart Grid Applications using ANN", Energy Procedia, vol. 12, Jan. 1, 2011, pp. 3-9; ISSN: 1876-6102; DOI 10.1016/j.egypro.2011.10.003; Jan. 1, 2011.

Salcedo-Sanz, S. et al: "Accurate short-term wind speed prediction by exploiting diversity in input data using banks of artificial neural networks", Neurocomputing, Elsevier Science Publishers, vol. 72, No. 4-6; ISSN:0925-2312; DOI:10.1016/j.neucom.2008.09.010; pp. 1336-1341; 2009; NL; Jan. 1, 2009.

Z.W. Zheng et al.: "An Overview: the Development of Prediciton Technology of Wind and Photovoltaic Power Generation", Energy Procedia, vol. 12, Jan. 1, 2011, pp. 601-608.

Jochen Cleve et al.: "Model-based analysis of wake-flow data in the Nysted offshore wind farm", Wind Energy, vol. 12, No. 2, Mar. 1, 2009, pp. 125-135.

International Search Report dated Oct. 24, 2012 issued in corresponding International patent application No. PCT/EP2012/064529.

Written Opinion dated Oct. 24, 2012 issued in corresponding International patent application No. PCT/EP2012/064529.

Russian Federation Office Action, dated Sep. 17, 2015, issued in corresponding Russian Federation Patent Application No. 2014110489/08(016495). Total 9 pages.

* cited by examiner

METHOD FOR THE COMPUTER-ASSISTED MODELING OF A WIND POWER INSTALLATION OR A PHOTOVOLTAIC INSTALLATION WITH A FEED FORWARD NEURAL NETWORK

CROSS-REFERENCE TO RELATED APPLICATIONS

The present application is a 35 U.S.C. § 371 national phase application based on PCT/EP2012/064529, filed Jul. 24, 2012, which claims priority of German Patent Application No. 10 2011 081 197.4, filed Aug. 18, 2011, the contents of both of which are incorporated in full by reference herein. The PCT International Application was published in the German language.

FIELD OF THE INVENTION

The invention relates to a method for the computer-assisted modeling of a technical system and to a method for predicting one or more operating parameters of a technical system.

BACKGROUND

In a multiplicity of fields of application, it is desirable to model the behavior of a technical system in a computer-assisted manner in order to thereby predict particular operating parameters of the technical system. In the field of electrical energy generation, for example, regenerative energy generation installations whose generated amounts of energy are greatly influenced by external variables and, in particular, by weather conditions are being used more and more often. For a technical system in the form of a regenerative energy generation installation, it is therefore desirable to suitably predict the amount of energy generated in future in order to thereby be able to better plan the energy feed of such an energy generation installation.

The object of the invention is therefore to model a technical system in a computer-assisted manner in such a way that its operating parameters can be reliably and accurately predicted.

SUMMARY OF THE INVENTION

A method according to the invention uses an artificial neural network to model a technical system in a computer-assisted manner. One or more output vectors may be modeled on the basis of one or more input vectors by the learning process of the neural network based on training data comprising known input vectors and output vectors, a respective output vector comprising one or more operating variables of the technical system and a respective input vector comprising one or more input variables which influence the operating variable(s).

In one embodiment, the neural network is a special variant of a feed-forward network. A feed-forward network is characterized in that a plurality of neuron layers above one another are coupled to one another in a processing direction from lower to higher layers via suitable weights in the form of weighting matrices, the neurons within a layer not being connected to one another. The feed-forward network used in a method according to the invention is a multi-layer network having a plurality of layers which are connected to one another and comprise an input layer, a plurality of hidden layers and an output layer. In this embodiment, the input layer contains a number of input neurons for describing the input vector(s). In contrast, a respective hidden layer comprises a number of hidden neurons, and an output layer contains a number of output neurons for describing the output vector(s).

The neural network in a method according to the invention may be distinguished by the fact that the output layer comprises a plurality of output clusters each comprising one or more output neurons, the plurality of output clusters corresponding to the plurality of hidden layers, and each output cluster describing the same output vector and being connected to another hidden layer. An output cluster is therefore assigned to each hidden layer, the hidden layer being coupled only to this output cluster. Separate output clusters are consequently produced and describe the same operating parameters of the technical system independently of one another in the neural network. In contrast to conventional feed-forward networks, the hidden layers below the uppermost hidden layer in the neural network according to the invention are not only connected to a higher hidden layer but also to an output cluster of the output layer. As a result, additional error information is supplied to the output layer, with the result that a neural network which has accordingly learned can better predict the operating parameters of a technical system. Since each of the output clusters provides the same operating parameters, the predicted operating parameters can be represented, for example, by means of averaging over the output clusters.

In one particularly preferred embodiment of a method according to the invention, the input layer of the neural network is connected to each of the hidden layers, which is not the case in conventional feed-forward networks. There, the input layer is coupled only to the lowermost hidden layer. In this manner, the input variables which influence the operation of the technical system are directly included in each hidden layer, which in turn results in improved prediction of the operating variables of the technical system.

In one particularly preferred embodiment of a method according to the invention, corresponding operating variables of the technical system are modeled by the neural network for a longer future period. In this case, a respective output vector comprises one or more operating variables for a plurality of successive future times within a future period, the future period preferably comprising one or more days and the times preferably having an interval of one hour. Such periods are suitable, in particular, for predicting amounts of energy which are generated by regenerative energy generation installations, as described in more detail further below.

In another preferred embodiment of the invention, the input vectors of the input layer of the neural network also represent predicted variables. In this embodiment, the respective input vector comprises one or more predicted input variables for a future time of successive future times within a future period, the future period preferably comprising one or more days in a similar manner to the output vectors and the times preferably having an interval of one hour. The corresponding prediction times for the input vectors may possibly correspond to the prediction times for the output vectors.

As already mentioned above, a method according to the invention is used, in one preferred variant, to model a technical system in the form of an electrical energy generation installation and, in particular, in the form of a regenerative electrical energy generation installation. In this variant, the energy generation installation is, in particular, a wind power installation having one or more wind turbines, for example, in the form of a wind farm. The energy generation installation may also be a solar energy installation, in particular a solar thermal installation and/or a photovoltaic installation.

When using a method according to the invention for an energy generation installation, in one preferred variant, a respective output vector comprises, as operating variables, amounts of energy generated by the energy generation installation for a plurality of successive future times. In this variant, the term of the amount of energy should be broadly understood and may relate to the amount of energy generated in a particular period or to an amount of energy per unit time and therefore an electrical power. An amount of energy is preferably the amount of energy generated between two successive future times. For the respective time considered, this amount of energy is the amount of energy which is generated between the previous time and the considered time and can also be stated in the form of an electrical power (that is to say amount of energy divided by the interval between the times).

In another preferred embodiment, when modeling an energy generation installation, use is made of input vectors each comprising, as input variables, one or more predicted environmental conditions for a future time from a plurality of future times, the predicted environmental conditions being weather data or weather forecasts, in particular, which come from a meteorological service, for example. In this embodiment, the predicted weather data relate to data determined at a location at or as close as possible to the geographical location of the corresponding energy generation installation. The predicted environmental conditions preferably comprise in this case one or more of the following variables:

one or more ambient temperatures;
one or more humidity values;
one or more wind speeds and/or wind directions.

These variables are used, in particular, in connection with an energy generation installation in the form of a wind power installation. Temperature values for different altitudes, in particular for 25 m, 50 m or 150 m, can be taken into account, for example, as a result of which account is taken of the fact that the wind turbines of a wind power installation have large diameters. In addition to or as an alternative to said variables, one or more values relating to the cloud cover of the sky or one or more solar radiation values (for example stated in light intensities) can be taken into account as further environmental conditions. The last-mentioned environmental conditions are concomitantly included, in particular, when using the method according to the invention to model solar energy installations.

In one preferred variant of the invention, the modeling of the technical system and a prediction based on the latter can be improved by also taking into account the outputs of an analytical model. In this variant, the input layer of the neural network comprises one or more input neurons for describing one or more further input vectors. These further input vectors differ from the input vectors for describing the input variables. They instead represent one or more of the operating variables of the technical system which are determined using a suitable analytical model. In analogy to the neural network, the analytical model also provides operating variables of the technical system based on corresponding input variables.

The number of hidden layers and hidden neurons can be selected differently in the neural network of the invention, depending on the application. In one variant of the invention, ten or more hidden layers and therefore also ten or more output clusters may be provided in the neural network. The number of hidden neurons in the hidden layer is between 20 and 30 neurons, for example.

Within the scope of a method according to the invention, the neural network may learn using learning methods which are known per se. In particular, as part of the learning process, the difference between the output vector described by the output cluster and the output vector according to the training data is minimized in this case, as the target variable, for each output cluster. In one preferred variant, the learning process is implemented using the error back-propagation method which is sufficiently well known from the prior art.

In addition to the above-described method for modeling a technical system, the present invention also relates to a method for predicting one or more operating parameters of a technical system, in which case one or more input variables are supplied, via the input layer, to a neural network which learns using a method according to the invention, whereupon the neural network determines a corresponding output vector having one or more operating parameters of the technical system for at least one output cluster of the output layer of the neural network. The prediction method has the advantage that possibly only a particular part of the neural network can be used during the prediction and higher hidden layers with the output vectors coupled to the latter are omitted in the prediction. In particular, that section of the neural network which is used for the prediction can be suitably determined in this case on the basis of the prediction quality.

In one variant of the prediction method according to the invention, corresponding output vectors are determined for a plurality of output clusters and, in particular, for all output clusters. In this case, the operating variables of the output vectors can then be averaged, the average value then representing the predicted operating variable.

In addition to the methods described above, the present invention also relates to a computer program product having a program code which is stored on a machine-readable data storage medium and is intended to carry out the corresponding methods or preferred variants of the methods when the program code is executed on a computer.

BRIEF DESCRIPTION OF THE FIGURES

Exemplary embodiments of the invention are described in detail below using the accompanying figures, in which.

DETAILED DESCRIPTION

An embodiment of a method according to the invention is explained below using a technical system in the form of a wind power installation, in which case the method is used to predict the amounts of energy, which are generated by the wind power installation and are fed into a power supply system, via a neural network. This prediction uses environmental conditions to which the wind power installation is exposed. In this embodiment, the environmental conditions are weather data which are likewise predictions which come from a meteorological service, for example. In the embodiment described here, the temperature, the humidity and the wind direction and wind strength were taken into account as environmental conditions for the location at which the wind turbines of the wind power installation are erected. In this embodiment, temperatures for different altitudes may be included since the mast of the individual wind turbines extends over a relatively long length in the vertical direction. In particular, temperature values at the altitude of 25 m, 50 m and 150 m can be taken into account, for example.

A method according to the invention can possibly also be used for energy generation installations other than wind power installations. For example, the method can be used to predict the amounts of energy generated by a photovoltaic installation. In this case, the temperature, humidity, wind direction and wind strength are preferably likewise included as input variables. The degree of cloud cover of the sky and the solar radiation are additionally also taken into account in this case. However, it is no longer necessary to determine temperature values for different altitudes since the panels of a photovoltaic installation are generally at a consistent height level.

The prediction carried out using a method according to the invention is implemented using a neural network which learns using suitable training data comprising known amounts of energy generated and known environmental conditions. In this case, the neural network has a special network structure which is shown in FIG. 1.

Figure 1:
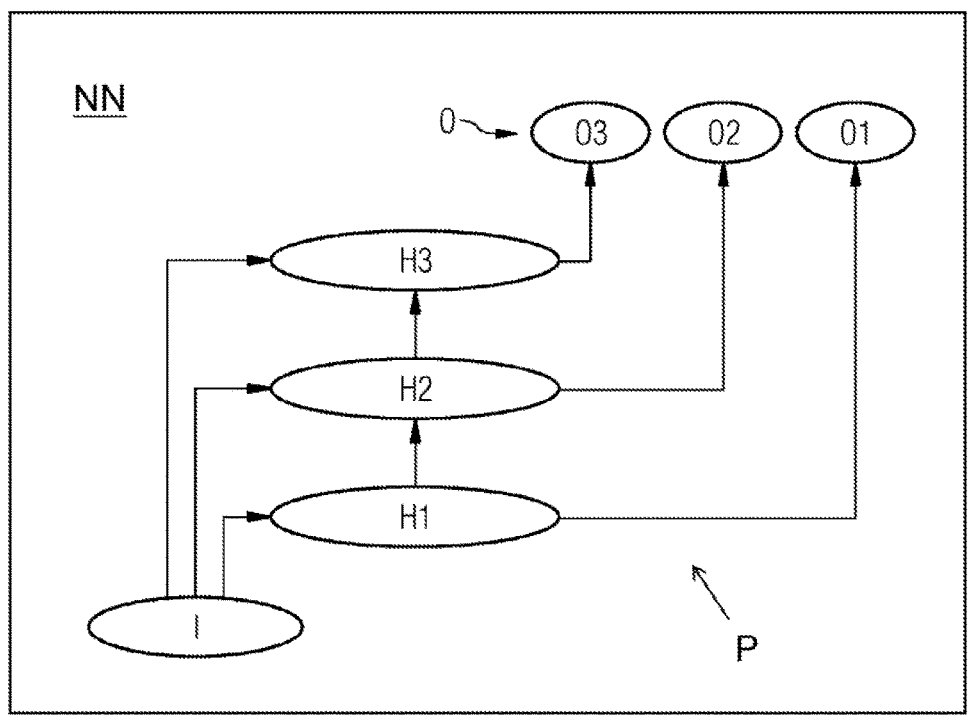
FIG. 1 shows a schematic illustration of an embodiment of a neural network structure used in a method according to the invention.

The neural network NN in FIG. 1 is a feed-forward network having a plurality of layers above one another, in which case the different layers are coupled only in the processing P direction from lower to higher layers and, within a layer, the neurons contained therein are not coupled to one another. The network in FIG. 1 comprises an input layer I having input neurons, three hidden layers H1, H2 and H3 with hidden neurons, and an output layer O which is subdivided into three separate output clusters O1, O2 and O3 comprising output neurons. The couplings between the layers which are known per se and via which the neurons in one layer are connected to the neurons in the other layer using corresponding weighting matrices are indicated by arrows. The activation functions of the individual neurons are non-linear in the network in FIG. 1 and are represented, for example, by a tan h.

In contrast to a conventional feed-forward network, the neural network in FIG. 1 is distinguished by the fact that there is a separate output cluster O1, O2 and O3 for each of the hidden layers H1, H2 and H3. That is to say, each hidden layer is assigned to precisely one output cluster and each output cluster is coupled only to a hidden layer via weighting matrices. A feed-forward network conventionally contains only one connection between the uppermost hidden layer and the output layer. As a result of the inventive use of additional output clusters which are connected to lower hidden layers, the output layer is supplied with additional error information, as a result of which disappearance of the error information for small weights is avoided.

Each of the output clusters O1 to O3 predicts the same amounts of energy of the wind power installation for a multiplicity of future times. That is to say, each output cluster predicts the same operating variables of the wind power installation. Therefore, each output cluster provides prediction values for the amounts of energy independently of the other clusters. In this case, the average value of the amounts of energy from the individual output clusters can be determined, for example, as the definitive prediction value for a respective future time. In the embodiment described here, an output cluster describes hourly predictions for the amounts of energy generated with the wind power installation within a prediction period of one or more days. In this embodiment, an individual output neuron represents a predicted amount of energy for a particular time. If an interval of one day is considered as the prediction period, an output cluster therefore contains 24 neurons for each hour within one day.

Another difference between the network in FIG. 1 and conventional feed-forward networks is the fact that the input layer I is directly connected not only to the lowermost hidden layer H1 but also to the other hidden layers H2 and H3 above it. This supply of the input layer to all hidden layers avoids the information from the input layer being lost during processing in the neural network.

When using the neural network for wind power installations, the input layer I contains a multiplicity of input neurons which form corresponding input vectors, each input vector representing predicted weather data at a particular prediction time. In analogy to the output layer, predicted weather data can be taken into account at hourly intervals for the next 24 hours. That is to say, the input layer contains a corresponding input vector for each hour, which input vector comprises an input neuron for each predicted value. Depending on the application, the number of hidden layers used in the neural network may vary. For example, it is possible to use ten hidden layers which then in turn lead to ten output clusters. The number of neurons in the individual hidden layers may likewise vary. In particular, a hidden layer may comprise 20 to 30 neurons.

In a modification of the neural network in FIG. 1, in addition to the input vectors which describe environmental conditions, further input vectors which represent predictions of the amounts of energy which were determined using an analytical model are taken into account. In a variant implemented by the inventors, the Jensen model which is known per se from the prior art was used as the analytical model. This model describes the amounts of energy generated by wind power installations on the basis of weather data and is described, for example, in N. O. Jensen. A Note on Wind Generator Interaction. Technical Report m-2411, Risø, Roskilde, 1983 and I. Katic, J. Højstrup, and N. O. Jensen. A Simple Model for Cluster Efficiency. In EWEC 1986, Vol. 1, pages 407-410, Rode, 1986. The use of operating parameters predicted using an analytical model as further input vectors makes it possible to further improve the prediction quality of the neural network.

During the learning process of the neural network in FIG. 1, each of the output clusters O1 to O3 learns using training data comprising known predicted weather data and amounts of energy based on the latter, in which case the target value of the learning process is to minimize the difference between the amounts of energy output via the respective output clusters and the amounts of energy according to the training data. In this case, the neural network may learn in a manner known per se using conventional learning methods. In one particularly preferred variant, the error back-propagation method which is known from the prior art is used.

After the neural network has learned using suitable training data, feed powers generated in future during real operation of the wind power installation can then be predicted. It is therefore possible for the operator of the wind power installation to achieve better planning when providing the amount of energy generated. In particular, the operator can adapt his offer of amount of energy on the energy market to the prediction values. On the basis of a suitable prediction of the future energy generation, the amounts of energy generated can also be better used as control energy in the energy network. When using the neural network during real operation of a technical system, it is also possible for this network to learn further online during operation at regular intervals based on new amounts of energy which are actually generated.

Figure 2:
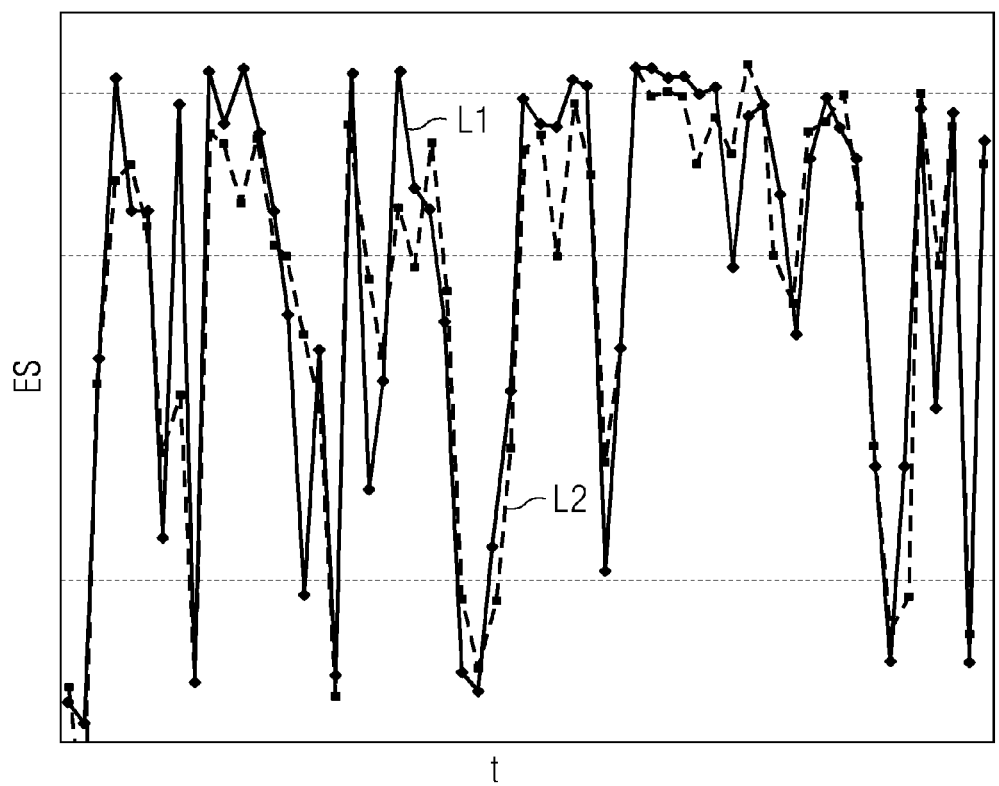
FIG. 2 shows a graph that compares amounts of energy of a wind power installation which are predicted using the method according to the invention with the amounts of energy actually generated.

FIG. 2 shows a graph which compares the amounts of energy of a wind power installation which are predicted using a neural network according to the invention with the amounts of energy which are actually generated. In this case, the time t in units of days is plotted along the abscissa of the graph and the amount of energy ES (ES=Energy Supply) generated for a corresponding day is plotted along the ordinate. In this case, the dashed line L2 represents amounts of energy predicted using the neural network according to the invention for a prediction time of 12 hours in the future. In contrast, the solid line L1 represents the amounts of energy actually generated by the wind power installation. It is seen that a very good prediction of amounts of energy and therefore of feed powers of a wind power installation can actually be achieved using the neural network according to the invention.

The embodiments of the method according to the invention which were described above have a number of advantages. In particular, operating parameters of a technical system can be predicted very well with a high degree of non-linearity using the neural network structure according to the invention in which output clusters are provided for each hidden layer. The method is particularly well-suited to predicting the amounts of energy generated by a regenerative energy generation installation on the basis of predicted weather data, in which case amounts of energy possibly additionally determined using an analytical or physical model can be supplied to the input layer of the neural network.

The invention claimed is:

1. A method for predicting one or more operating parameters of a technical system, wherein one or more input variables are supplied, via an input layer (I), to a neural network (NN), the method for predicting comprising a modeling method for the computer-assisted modeling of the technical system, the modeling method comprising:
   modeling one or more output vectors on the basis of one or more input vectors by a learning process of the neural network (NN) based on training data comprising known input vectors and output vectors, a respective output vector comprising one or more operating variables of the technical system and a respective input vector comprising one or more input variables which influence the operating variable(s); wherein
   the neural network (NN) is a feed-forward network comprising the input layer (I), a plurality of hidden layers (H1, H2, H3) and an output layer (O), the input layer (I) containing a number of input neurons for describing the input vector(s), and each respective hidden layer (H1, H2, H3) containing a number of hidden neurons, and the output layer (O) containing a number of output neurons for describing the output vector(s); and wherein the input layer, the plurality of hidden layers and the output layer are connected to one another and wherein the output layer (O) comprises a plurality of output clusters (O1, O2, O3) each comprising one or more output neurons, and each output cluster being assigned and connected to one of the hidden layers only, and each output cluster (O1, O2, O3) describing the same output vector as the other output clusters, wherein the technical system is a wind power installation or a photovoltaic installation;
   wherein a first input vector comprises, as input variables, one or more predicted environmental conditions for a future time from a plurality of future times, and
   wherein the predicted environmental condition(s) are weather data comprising at least one of the following variables:
   ambient temperatures; humidity values; wind speeds; wind directions: values relating to the cloud cover of the sky; and solar radiation values;
   wherein a first output vector comprises, as operating variables, amounts of energy (ES) generated by the energy generation installation for a plurality of successive future times, an amount of energy (ES) being the amount of energy generated between two successive future times;
   the neural network (NN) determines, using the first input vector, the first output vector having one or more operating parameters of the technical system for at least one output cluster (O1, O2, O3) of the output layer (O); and
   adjusting an amount of energy sold on an energy market, wherein the amount of energy sold is generated by the wind power installation or the photovoltaic installation based on the first output vector; or supplying predicted generated energy based on the first output vector as control energy in an energy network.

2. The method for predicting as claimed in claim 1, wherein the input layer (I) of the neural network (NN) is connected to each of the hidden layers (H1, H2, H3).

3. The method for predicting as claimed in claim 1, wherein a respective output vector comprises one or more operating variables for a plurality of successive future times within a future period.

4. The method for predicting as claimed in claim 1, wherein a respective input vector comprises one or more predicted input variables for a future time of successive future times within a future period.

5. The method for predicting as claimed in claim 1, wherein the input layer (I) also comprises one or more input neurons for describing one or more further input vectors, the further input vector(s) comprising one or more of the operating variables of the technical system which are determined using an analytical model.

6. The method for predicting as claimed in claim 1, wherein at least 10 hidden layers are provided or each hidden layer comprises between 20 and 30 hidden neurons.

7. The method for predicting as claimed in claim 1, wherein during the learning process of the neural network, the difference between the output vector described by the output cluster (O1, O2, O3) and the output vector according to the training data is minimized, as the target variable, for each output cluster (O1, O2, O3).

8. The method for predicting as claimed in claim 1, wherein the learning process of the neural network takes place on the basis of error back-propagation.

9. The method for predicting as claimed in claim 1, wherein the corresponding output vectors are determined for a plurality of output clusters and for all output clusters (O1, O2, O3), the operating variables of which output vectors are then averaged.

10. A computer program product having a program code which is stored on a non-transitory machine-readable data storage medium and is intended to carry out a method as claimed in claim 1 when the program code is executed on a computer.

11. The method for predicting as claimed in claim 1, wherein the electrical energy generation installation is a regenerative electrical energy generation installation.

12. The method for predicting as claimed in claim 3, wherein the future period comprises one or more days and the times have an interval of one hour.

13. The method for predicting as claimed in claim 4, wherein the future period comprises one or more days and the times have an interval of one hour.

* * * * *